Jan. 20, 1959     E. H. SAHAGIAN     2,869,893
STABILIZING MEANS FOR THE AIR SPRINGS OF AN AUTOMOBILE
Filed Oct. 16, 1957                           7 Sheets-Sheet 1

Fig. 1.

INVENTOR.
Edward H. Sahagian
BY

Jan. 20, 1959     E. H. SAHAGIAN     2,869,893
STABILIZING MEANS FOR THE AIR SPRINGS OF AN AUTOMOBILE
Filed Oct. 16, 1957     7 Sheets-Sheet 2

INVENTOR.
Edward H. Sahagian
BY

Fig. 15.

United States Patent Office 2,869,893
Patented Jan. 20, 1959

2,869,893

STABILIZING MEANS FOR THE AIR SPRINGS OF AN AUTOMOBILE

Edward H. Sahagian, Dorchester, Mass.

Application October 16, 1957, Serial No. 690,554

8 Claims. (Cl. 280—124)

This invention relates to automobiles of that type in which the automobile body is supported on so-called "air springs," and especially to a stabilizing mechanism by which the automobile body is maintained in a substantially horizontal position under different driving conditions, of which the following are examples. When an automobile traveling at any reasonable speed makes a sharp turn in either direction the resulting centrifugal force cause the side of the body on the outside of the curve in which the automobile is traveling to move downwardly from its normal level and the opposite side of the body to move upwardly from said level, so that the body tends to tip sideways.

When the automobile is heavily loaded in the rear, the rear end of the body will sink below its normal position and the front end of the body will rise above its normal position, so that the body is tipping backwards.

When an automobile which is traveling at a reasonable speed is suddenly stopped by the application of the brakes the front end of the body will dip downwardly and the rear end will move upwardly.

One object of the present invention is to provide a novel stabilizing means which will maintain the automobile body in a substantially level or horizontal position under any of the above or other driving conditions which produce forces tending to displace either end or either side of the automobile body vertically from its normal level position.

Another object of the invention is to provide a stabilizing mechanism which is rendered operative to accomplish its purpose by the initial displacing movement of the automobile body.

Another object of the invention is to provide a stabilizing device of this type in which the tendency of one side or end of the automobile body to sink below its normal level is counteracted by introducing added air into the air springs on said side or end, and the tendency of either end or side of the body to rise above its normal level is counteracted by releasing some air from the air springs at said end or side.

Other objects of the invention are to provide various improvements in a stabilizing device such as above referred to, which will be hereinafter set forth.

In the drawings wherein I have illustrated more or less diagrammatically a stabilizing device embodying the invention.

Inasmuch as the invention relates to the stabilizing means for the air springs of an automobile it has not been deemed necessary to illustrate any parts of the automobile except those parts required to mount the air springs.

Figure 1:
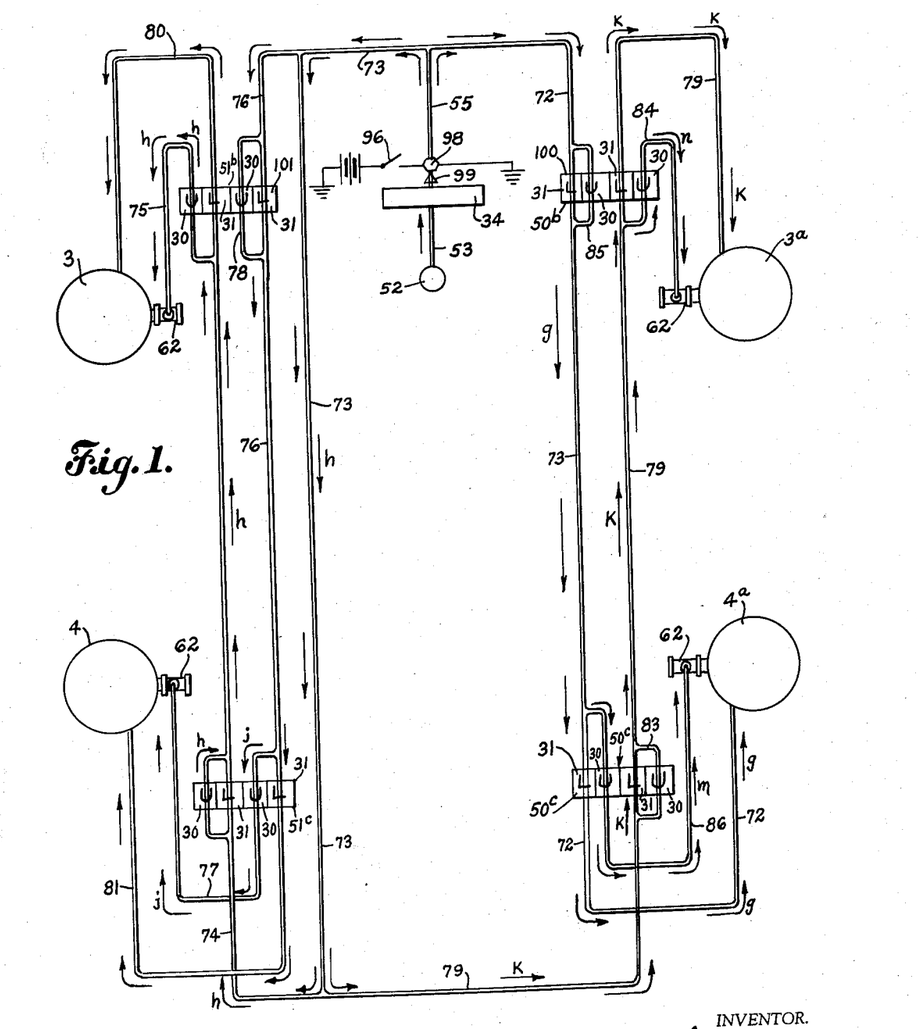
Fig. 1 is a diagrammatic view illustrating one embodiment of the invention.
Figure 15:
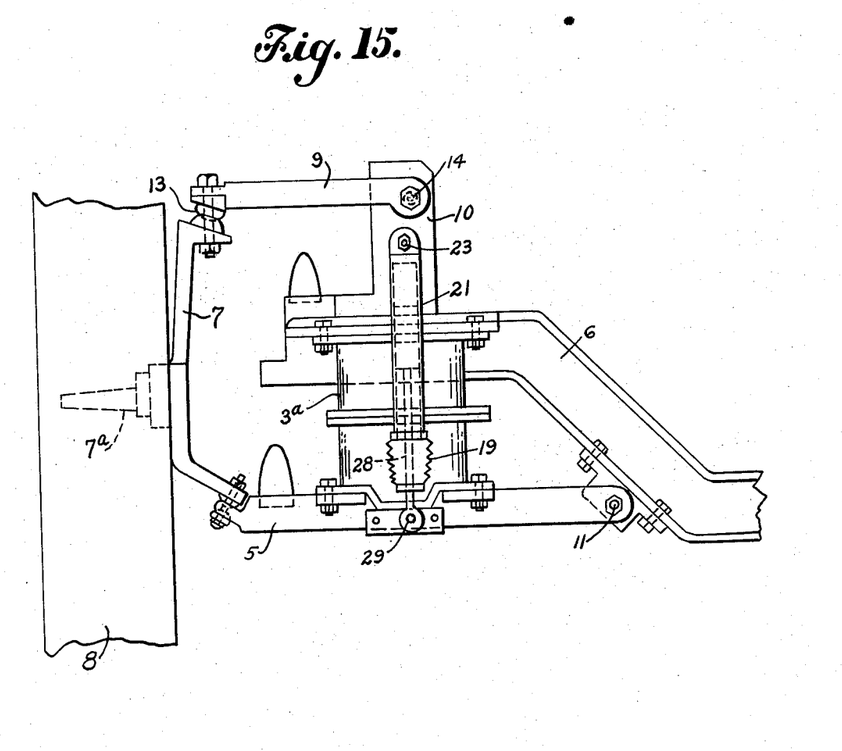
Fig. 15 is a view showing one way in which each of the front air springs may be mounted, said view showing the right front air spring as seen when observed from a position in front of the automobile.
Figure 16:
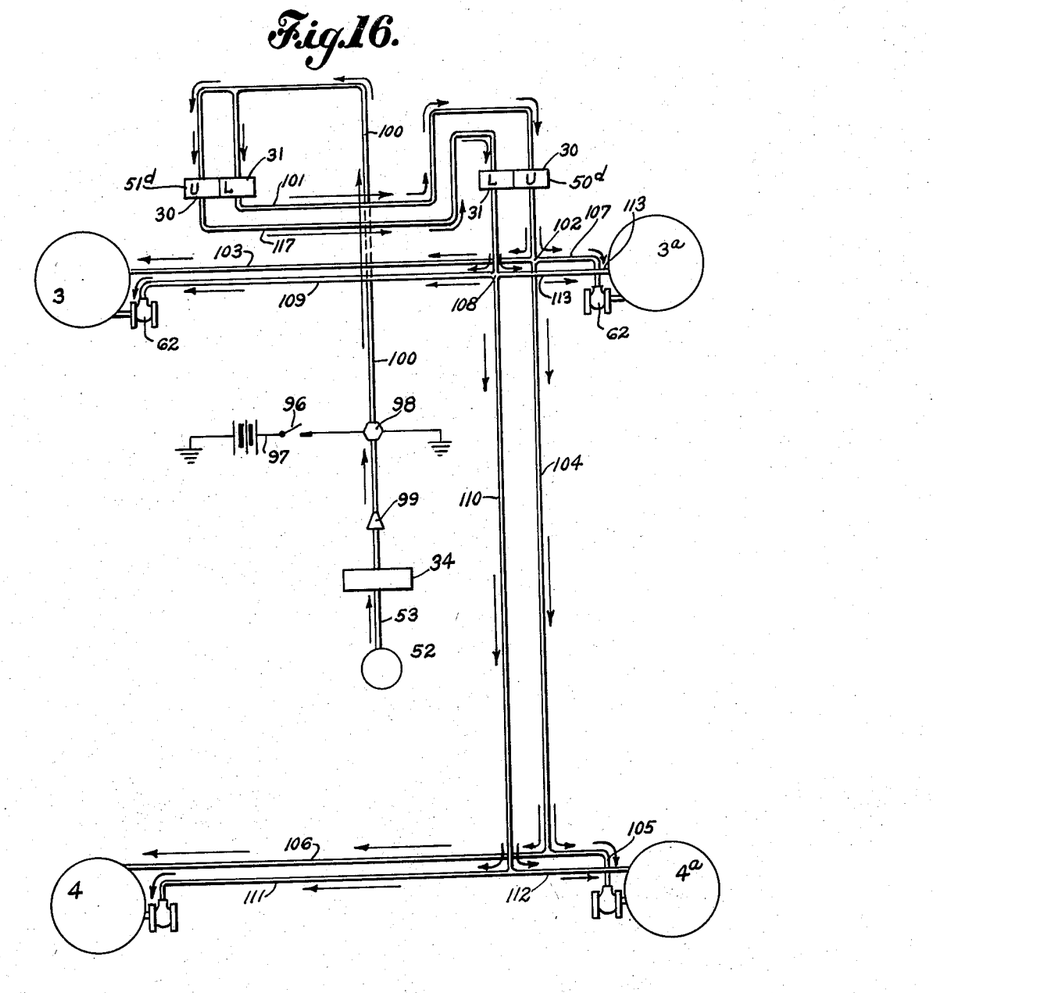
Fig. 16 illustrates a different embodiment of the invention.

Referring to Figs. 1 and 16, the front air springs of an automobile are indicated at 3 and 3a, and the rear air springs are indicated at 4 and 4a, 3 and 4 being the air springs on the left side of the automobile and 3a and 4a being the air springs on the right side. These air springs may have any usual or suitable construction and each is in the form of an expansible and contractible chamber containing air under suitable pressure. The front air springs may be mounted adjacent the front wheels in any suitable way, and in Fig. 15 (which is a view from the front of the automobile) there is shown a construction for mounting the right front air spring 3a in which said spring is mounted on a spring support 5, which may be the usual lower control or suspension arm for said air spring and which is pivotally connected at one end to a portion 6 of the frame of the automobile body as shown at 11, the other end of said support 5 being pivotally mounted to a wheel supporting element 7 provided with an axle 7a on which the right front wheel 8 is mounted. The wheel supporting element 7 is also connected to the frame element 6 by an upper control or suspension arm 9, said arm having a pivotal connection to both the element 7 and an extension 10 of the frame element 6. The frame element 6 rests on and is supported by the air spring 3a.

Figure 3:
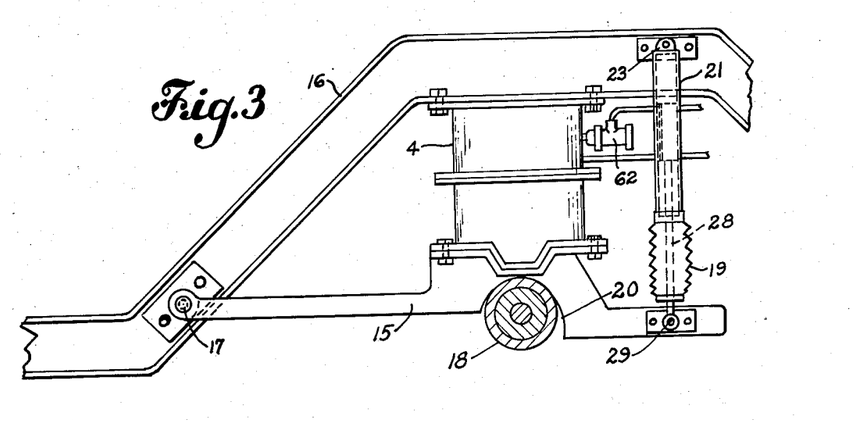
Fig. 3 is a fragmentary view showing one way in which a rear air spring may be mounted.

One way of supporting each of the rear air springs is illustrated in Fig. 3, wherein the left rear air spring 4 is secured to and supported by an air spring support 15 which is pivoted at 17 to a portion 16 of a body frame element which extends longitudinally of said body. The support element 15 rests on the rear axle housing 18, and is provided with a recess 20 in which said axle housing is received. The parts so far described may be such as are used in any automobile having air springs for supporting the automobile body and form no part of the present invention.

The introduction of added air to the air springs at either end or at either side of the automobile body which is subjected to forces which tend to depress said end or side below its normal level, and also the release of air from the air springs at either end or at either side of the automobile body when it tends to rise above its normal level, is controlled by the joint action of two control valve devices which are tandem-connected and are simultaneously rendered operative to perform their intended function by the initial displacing movement of the automobile body. In one embodiment of the invention there is a control valve device associated with each air spring. Each control valve device has at least one cylinder element which is secured to the frame of the automobile body and thus partakes of its vertical movement in either direction, each cylinder having a piston valve element operating therein which is connected to the support for said air spring. Each piston valve therefore moves up and down with the wheel associated with said air spring. A control valve having a single cylinder is shown in Figs. 7–10 in which the cylinder is indicated at 21, it having a cylinder chamber in which operates a piston valve 22. The cylinder member 21 is pivotally connected at 23 to the body frame member 6 or 16 depending on whether said valve is used in connection with a front or a rear air spring. Each cylinder chamber has two inlet ports, an upper inlet port 24 and a lower inlet port 25, said ports being spaced apart in the lengthwise direction of the cylinder. Each cylinder also has an upper discharge port 26 opposite the upper inlet port 24 and a lower discharge port 27 opposite the lower inlet port 25.

Figures 7, 8, 9, 10:
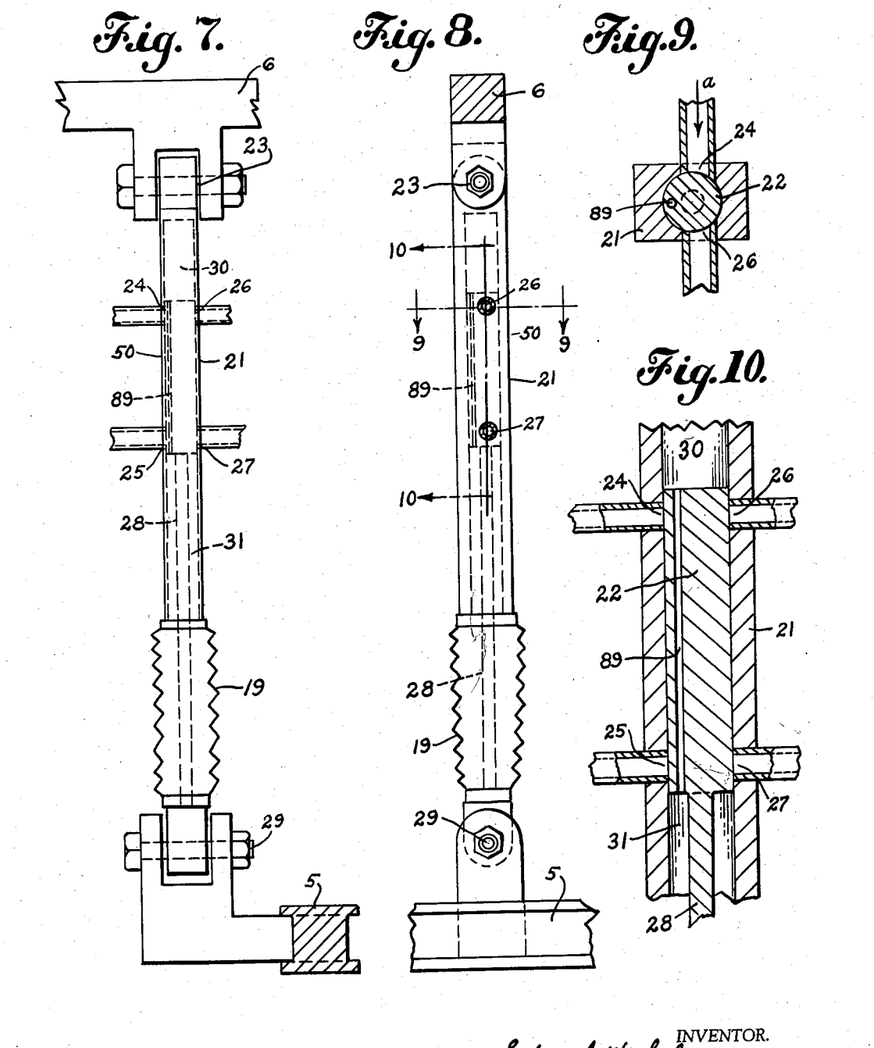
Fig. 7 is a front view of one form of the control valve.
Fig. 8 is a side view of said valve.
Fig. 9 is a section on the line 9—9, Fig. 8.
Fig. 10 is a section on line 10—10, Fig. 8.

The piston valve member 22 has an overall length slightly greater than the distance between the inlet ports 24 and 25, so that when said piston valve is in the position shown in Fig. 10 it closes both the inlet ports and the discharge ports. Said piston valve 22 has a piston rod 28 extending downwardly therefrom through the bottom end of the cylinder member. The projecting end of the piston rod is pivotally connected, as shown at 29, to the air spring support 5 or 15 of the air spring with which the valve is used. Each piston valve thus divides its cylinder into an upper cylinder chamber 30 and a lower cylinder chamber 31. The end of the piston rod 28 which projects beyond the lower end of the cylinder 21 is preferably enclosed in a flexible bellows-like casing 19, the upper end of which is connected to the lower end of the cylinder and bottom end of which is connected to the end of said piston rod, thereby providing protection therefor.

In Figs. 11–14 there is shown a control valve which has a cylinder member 21a that has two cylinders, in each of which operates a piston valve 22a, as described in connection with the structure shown in Figs. 7–10. Each cylinder has two inlet ports spaced from each other and two discharge ports, one opposite each inlet port. The inlet ports for one cylinder of the two-cylinder control valve are designated 24 and 25, and the two discharge ports for said cylinder are indicated at 26 and 27. The inlet ports for the other cylinder of the two-cylinder control valve are designated 24a and 25a and the corresponding discharge ports are designated 26a and 27a. The two piston rods of the two piston valves are connected to a head 32 which is pivotally connected at 33 to the support 5 or 15 for the air spring with which the control valve is used and the cylinder member 21a is pivotally connected at 33a to a portion 6 of the automobile body.

The piston valve in each cylinder has a small port 89 extending therethrough which provides a communication between the cylinder chambers 30 and 31 by which the pressure in said chambers is equalized, thus allowing the piston valve to move freely in its cylinder.

With this structure it will be understood that so long as the automobile is traveling over a smooth road surface under normal driving conditions the automobile body will be in its normal level position and the piston valves 22 will all be in the position shown in Fig. 10, thus closing both the inlet ports and the discharge ports of the cylinder. When, however, either end or either side of the automobile body is subjected to forces which tend to depress it to a lower level relative to the corresponding wheels, the cylinders connected to such end or side will move downwardly relative to the piston valves therein with the result that the lower inlet and discharge ports will be opened, the upper inlet and discharge ports remaining closed by the piston valve. The inlet ports all have communication with a pressure tank 34 containing air under a pressure greater than that in the air springs, and the lower discharge ports have communication, through a system of piping presently to be described, with the air containing chambers of the air springs, so that when the lower inlet and discharge ports are open air under pressure may be added to the air springs supporting the sinking end or side of the automobile body, thereby restoring such end or side to its normal level.

When either end or side of the automobile body is subjected to forces which tend to elevate such end or side above its normal level relative to the corresponding wheels, the corresponding cylinder members will move upwardly relative to the piston valves therein and the upper inlet and discharge ports will be opened, the lower inlet and discharge ports remaining closed by the piston valve. The upper discharge ports are connected by means of a system of piping presently to be described, to normally closed air release valves 62 connected with the air springs which are supporting the raised end or side of the automobile body and which are constructed to be opened when compressed air from the tank 34 is delivered thereto. When, therefore, either end or side of the automobile body rises above its normal level position, the upper inlet and discharge ports of each control valve at such end or side will be open and a charge of compressed air from the tank 34 will be delivered to the air release valves 62 associated with the air springs at said end or side of the automobile body, thus air will be released from said air springs.

Figures 5, 6:
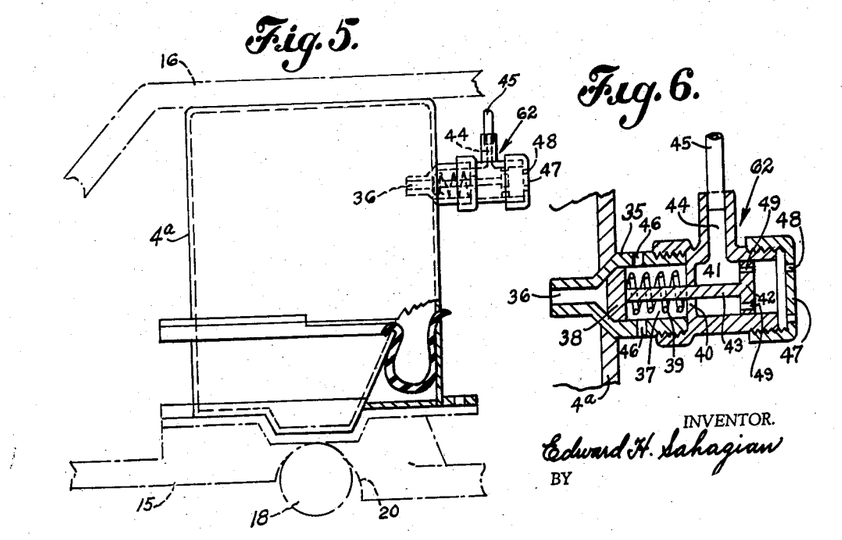
Fig. 5 shows an air spring equipped with an air release valve.
Fig. 6 is a sectional view of the air release valve

A release valve 62 which is suitable for this purpose is illustrated in Figs. 5 and 6. This valve has a valve casing 35 which is secured to the air spring and which is provided with a port 36 communicating with the air chamber of the air spring. The valve casing also has a valve chamber 37 in which is located a valve 38 for closing the port 36, said valve being held to its seat by a spring 39 located in the valve chamber and backed by the end 40 of said chamber. The valve casing 35 is also provided with cylinder chamber 41 in which is located a piston 42 that is connected to the valve 38 by a stem 43 which extends through the partition 40. The cylinder chamber 41 is provided with an inlet port 44 to which is connected a pipe 45 that communicates with the upper discharge port of one of the control valves.

When air under the high pressure present in the storage tank 34 is admitted to the chamber 41 the pressure against the piston 42 is sufficient to unseat the valve 38 against the pressure of the spring 39. Air from the air spring will then escape through the port 36 into the valve chamber 37 from which it passes to the atmosphere through the vent ports 46. The end 47 of the piston chamber 41 is provided with vent ports 48 to allow free movement of the piston 42 when it is moved backwardly to open the valve 38. The piston 42 has minute vent ports 49 through which air may escape after the control valve has been closed, thereby allowing the spring 39 to close the valve 38.

Figure 4:
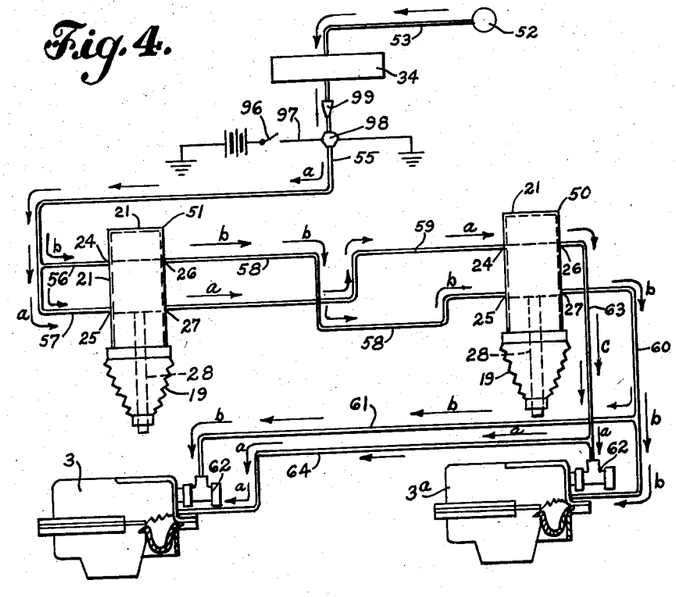
Fig. 4 shows the means for preventing either side of the automobile body from sinking below or rising above its normal level when making a change in direction to the left or right.

Referring to Fig. 4, which shows one embodiment of that portion of the stabilizing means which is operative to maintain the front end of the automobile body in its normal level position when it is subjected to forces that tend to move one side or the other of it above or below its normal level, 3 and 3a represent the two front air springs, 3 being the left front air spring and 3a being the right front air spring. The control valve associated with the right front air spring 3a is indicated at 50 and that associated with the left front air spring 3 is designated 51. The pressure storage air tank is shown at 34, the air pressure in said tank being maintained by a pump 52 which is connected to the tank by the pipe connection 53. An air delivery pipe 55 leads from the tank and is connected by suitable piping to the inlet ports of the control valves 50 and 51 as will be presently described. The delivery pipe 55 is shown as having therein a check valve 99 and also an electric shut-off valve 98, which may be controlled by the electric current in the ignition circuit 97 of the automobile, the construction being such that the closing of the switch 96 in said circuit will open the valve 98 and the opening of the switch will close the valve. The delivery pipe 55 has two branches 56 and 57, one of which leads to the upper inlet port 24 of the cylinder 21 of the control valve 51, and the other of which leads to the lower inlet port 25 of said cylinder. The upper discharge port 26 of said cylinder 21 of the control valve 51 is connected by a pipe 58 to the lower inlet port 25 of the cylinder 21 of the control valve 50, while the lower discharge port 27 of the control valve 51 is connected by a pipe 59 to the upper inlet port 24 of the control valve 50. These two control valves 50 and 51 thus constitute a pair of control valves which are tandem-connected by the pipes 58 and 59. The lower discharge port 27 of the control valve 50 is connected by a pipe 60 to the right front air spring 3a and said pipe 60 has a branch 61 which leads to the air release valve 62 of the left front air spring 3. The upper discharge port 26 of the control valve 50 is connected by a pipe 63 with the release valve 62 of the right front air spring 3a and by a branch pipe 64 to the air chamber of the left front air spring 3.

A similar installation may be used in connection with right and left rear air springs 4a and 4.

If it is assumed that the left side of the automobile body is subjected to forces that tend to move said side downwardly from its normal level and to move the right side upwardly from its normal level, then the initial downward movement of said left side will move the cylinder 21 of the control valve 51 downwardly and thus open the lower inlet and discharge ports 25 and 27 of said control valve 51, and the initial upward movement of the cylinder of the control valve 50 will open the upper inlet port 24 and upper discharge port 26 of the control valve 50. Air under pressure will then flow from the tank 34 through the pipe 55 and the branch pipe 57 to and through the control valves 51 and 50 successively (said control valves constituting a pair of tandem-connected control valves) and thence to the air-release valve of the right front air spring 3a and to the air chamber of the left front air spring 3. The path of such flow of compressed air is through the lower chamber 31 of the control valve 51 and the pipe 59 to and through the upper cylinder chamber 30 of the control valve 50 and through the pipe 63 to the release valve 62 of the right front air spring 3a and also through the branch pipe 64 directly into the air chamber of the left front air spring 3, as shown by the arrow a in Fig. 3. The admittance of added air to the left front air spring 3 and the release of air from the right front air spring 3a will result in leveling the front end of the automobile body. A similar operation will take place in connection with the control valves for the rear right and left air springs 4 and 4a, added air being delivered to the left rear air spring 4 and air being released from the right rear air spring 4a. As the automobile body assumes its level position while still being subjected to the forces tending to depress the left side and elevate the right side the cylinders and piston valves of the control valves 50 and 51 will return to their normal relative positions as shown in Fig. 10, thereby closing both the inlet and discharge ports of each control valve and thus stopping further transfer of air to or from the air springs.

When the forces terminate which tend to depress the left side of the automobile body and elevate the right side thereof, the air which has been added to the left front and rear air springs 3 and 4, and the reduction of the air pressure in the right front and rear air springs 3a and 4a, will cause the left side of said body to be raised slightly above its normal position and the right side to assume a position below its normal level. This will result in moving the cylinder of the control valve 51 upwardly and that of the control valve 50 downwardly, thus opening the upper inlet and discharge ports in control valve 51 and the lower inlet and discharge ports in control valve 50. This will result in releasing sufficient air from the left front and rear air springs 3 and 4 to lower the left side of the body to its normal level, and in adding air to the right front and rear springs to raise the right side of the body to its normal level.

On the other hand if the right side of the automobile body is heavily loaded or some other driving conditions exist which tends to depress said right side below its normal level and to raise the left side above its normal level, the initial upward movement of the cylinder of the control valve 51 will open the upper inlet port 24 and discharge port 26 of said control valve, and the initial downward movement of the cylinder 21 of the control valve 50, will open the lower inlet port 25 and discharge port 27 of said latter control valve with the result that compressed air from the tank 34 will flow through the pipe 55 and branch pipe 56, through the upper inlet and discharge ports 24 and 26 of control valve 51, through pipe 58 which provides a tandem connection between the control valves 51 and 50, through the lower inlet and discharge ports 25 and 27 of the control valve 50 and through the pipe 60 directly into the right front air spring 3a and also through the branch pipe 61 to the release valve 62 of the left front air spring 3 as shown by arrows b. The increased air pressure thus established in the right front air spring 3a and the reduced pressure resulting in the left front air spring 3 will balance the forces tending to tip the right side of the automobile downwardly and the left side upwardly, with the result that the body will remain substantially in its normal level condition. It will be understood as stated above, that an arrangement similar to that shown in Fig. 4 will be used at each end of the automobile so that the two control valves at each side of the automobile will operate in unison. It will be noted that in order to have the stabilizing device function properly it is necessary to have the two control valves which are associated with the two air springs 3 and 3a connected in a tandem arrangement so that the air from the tank 34 which is to be delivered either to the air chamber of an air spring or to the air release valve 62 of another air spring has to pass through both control valves.

The piping arrangement shown in Fig. 4 is also adapted for use for holding the automobile body in its level position against the action of forces tending to depress either end of the body and to elevate the other end. For this purpose the two air springs which are associated with the two control valves that are connected in tandem would be the two air springs supporting the same side of the body.

Figure 2:
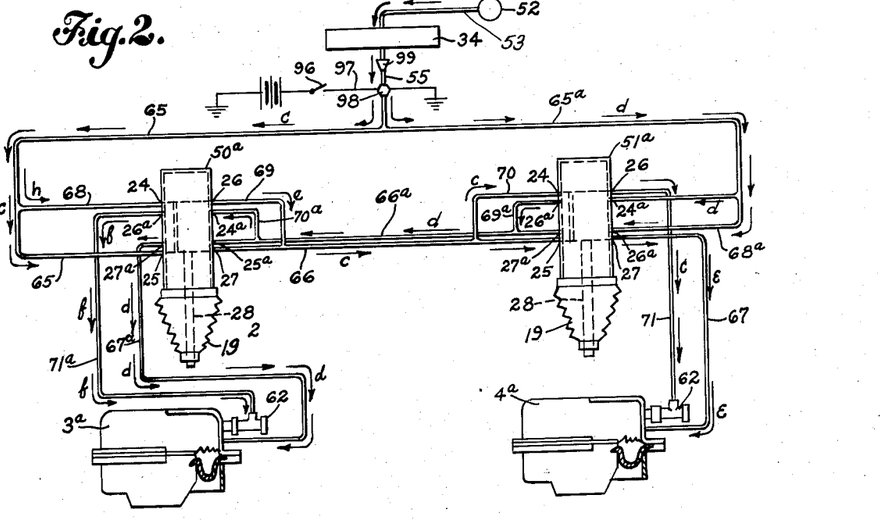
Fig. 2 illustrates an installation for preventing nose-diving of an automobile when it makes a sudden stop, or "squatting" when it makes a sudden start.
Figures 11, 12, 13, 14:
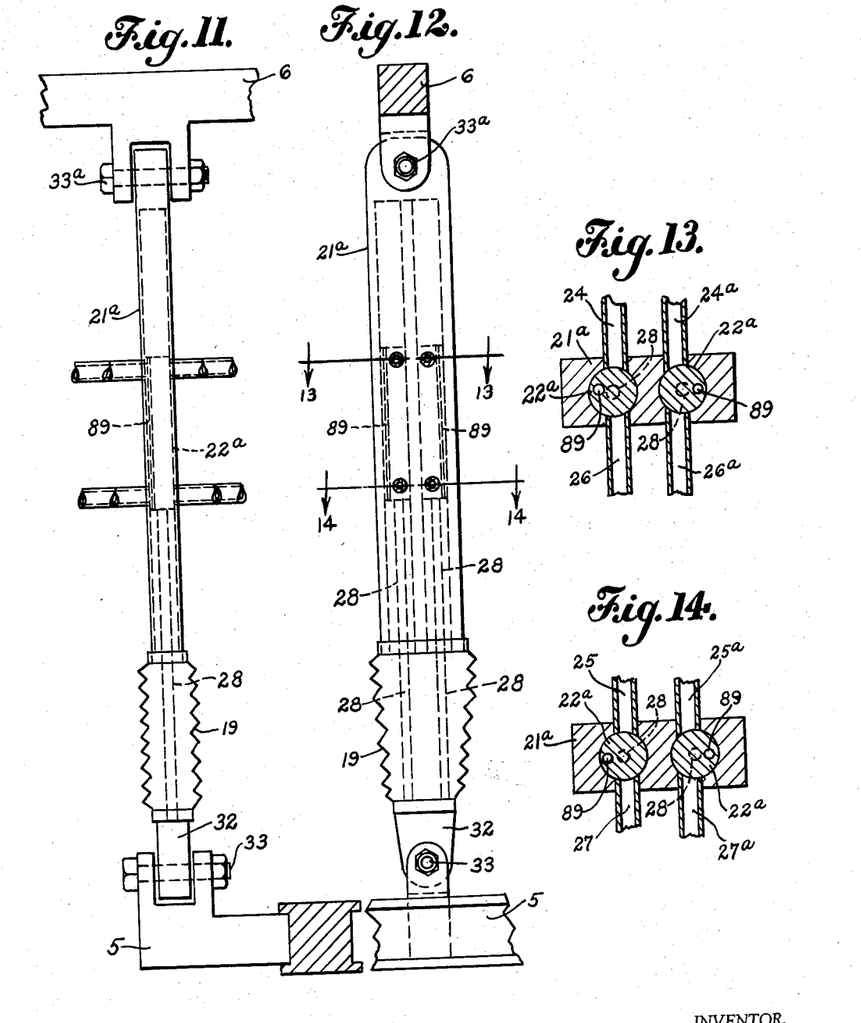
Fig. 11 is a view in elevation of a two cylinder control valve.
Fig. 12 is a side view of said valve.
Fig. 13 is a section taken on the line 13—13, Fig. 12.
Fig. 14 is a section on the line 14—14, Fig. 12.

Fig. 2 illustrates more or less diagrammatically an embodiment of that portion of the stabilizing device which maintains the automobile body substantially level when it is subjected to forces tending to tip it in a fore and aft direction. In this view the two air springs 3a and 4a which are shown are those on the right side of the automobile body and the two control valves, which are associated therewith and have a tandem arrangement are indicated at 50a and 51a, and are of the two cylinder type such as shown in Figs. 12–14. It is assumed that in Fig. 2 the two cylinders of each valve are located one behind the other so that only one cylinder of each valve is visible in the drawings.

The two inlet ports of one cylinder of each control valve are shown at 24 and 25 and the two discharge ports at 26 and 27. The two inlet ports of the other cylinder of each control valve are indicated at 24a and 25a and the two discharge ports at 26a and 27a. The ports 24a, 25a and 26a, 27a of the second cylinder of each control valve, i. e. the cylinder which is directly behind the one shown in Fig. 2, are shown as being spaced differently from the ports 24, 25 and 26, 27. This is merely to provide a clear illustration of the piping connecting the two control valves. If it is assumed that the automobile body is subjected to forces tending to depress the front end of the automobile body below its normal level, and to elevate the rear end above its normal level, then the cylinders of the control valve 50a will be moved downwardly and the cylinder of the control valve 51a will move upwardly. The lower inlet and discharge ports 25 and 27 of one cylinder of the control valve 50a will be opened and also the lower inlet and discharge ports 25a and 27a of the second cylinder of said control valve 50a. Upward movement of the cylinder of the control valve 51a will open the upper inlet and discharge ports 24, 26 and 24a, 26a of the two cylinders of said control valve 51a, the lower inlet and discharge ports thereof remaining closed. Compressed air from the tank 34 will then flow through the pipe 55, to and through the pipe 65 and thence to and through the lower inlet and discharge ports 25 and 27 of one cylinder of the control valve 50a, and through the pipes 66 and 70, to and through the upper inlet and discharge ports 24 and 26 of one cylinder of the control valve 51a and through the pipe 71 to the air release valve 62 of the rear right air spring 4a, as shown by arrows c. The compressed air will also flow from the pipe 55 through the pipe 65a to and through the upper inlet and discharge ports 24a and 26a of the second cylinder (the one not seen in Fig. 2) of control valve 51a thence through the pipes 69a and 66a to the lower inlet and discharge ports 25a and 27a of the second cylinder of the control valve 50a and thence through the pipe 67a into the air chamber of the front right air spring 3a, as shown by the arrows d.

The additional air thus delivered to right front air spring 3a will overcome the forces tending to depress the front end of the automobile body which is supported on said air springs and the release of air from the rear right air spring 4a will counteract the forces tending to elevate the rear end of the automobile body whereby said body will be maintained in a substantially level position. It will be noted that in the construction shown in Fig. 2, the control valves 50a and 51a are tandem-connected, and the flow of air for either delivering additional air to one air spring or for operating an air-release valve of another air spring is through the two tandem-connected control valves successively.

It will be understood that an arrangement of control valves and pipes similar to that shown in Fig. 2 will be used to govern the air pressure in the left front and rear air springs 3a and 4a.

In case the automobile body is subjected to forces tending to cause the front end of the automobile body to move upwardly from its normal level position and the rear end to move downwardly from its normal position, the control valves 50a and 51a will function to release air from the front right air spring 3a and introduce added air to rear right air spring 4a in the following manner. The initial upward movement of the front end of said body will move both cylinders of control valve 50a upwardly thus opening the upper inlet and discharge ports 24 and 26 and 24a and 26a of the cylinders of said control valve 50a, and the initial downward movement of the cylinder of the control valve 51a will open the lower inlet and discharge ports thereof. Under these circumstances compressed air will flow from the pipe 65 through branch pipe 68 to and through the upper inlet and discharge ports 24 and 26 of one cylinder of control valve 50a, through the pipes 69, and 66, to and through the lower inlet and discharge ports 25 and 27 of one cylinder of control valve 51a and thence through pipe 67 to the right rear air spring 4a, as shown by the arrows e, thereby adding air to said air spring. Compressed air will also flow from pipe 55 through pipe 65a and 68a to and through the lower inlet and discharge ports 25a and 27a of the second cylinder (not shown) of control valve 51a, thence through pipes 66a and 70a to the upper inlet and discharge ports 24a and 26c of the second cylinder of control valve 50a and through the pipe 71a to the release valve 62 of the right front air spring 3a as shown by arrows f. Air will thus be released from the front right air spring 3 and delivered into the right rear air spring 4a, thereby counteracting the forces tending to raise the front end of the automobile body and to depress the rear end thereof. In this operation, two control valves 51a and 50a constitute a pair of tandem-connected control valves through both of which the air flows successively. As stated above the air pressure in the left front and rear air springs 3 and 4 may be governed by control valves similar to those shown in Fig. 2.

In Fig. 1 there is shown an arrangement of the stabilizing means which is designed to be effective in maintaining the automobile body in a substantially level position when it is subjected to forces tending to tip it either sideways or in a fore and aft direction. The control valves used in this arrangement are the two cylinder type, each cylinder of each valve having the upper and lower cylinder chambers, 30 and 31, shown in Fig. 10 which are separated by the piston valve therein. The upper inlet and discharge ports, when opened, communicate with the upper cylinder chambers and the lower inlet and discharge ports communicate with the lower cylinder chambers.

In order to simplify the drawings in Fig. 1, each control valve is represented by a rectangle divided in the center to indicate the two cylinders, and each cylinder carries the two letters "U" and "L," which indicate the upper and lower cylinder chambers thereof. The front control valves are designated 50b and 51b and the rear control valves are designated 50c and 51c.

If it be assumed that the automobile body is subjected to forces tending to depress the right side thereof supported by the air springs 3a and 4a and to elevate the left side supported by the air springs 3 and 4, then the ports in the lower cylinder chambers 31 of the control valves 50b and 50c associated with the air springs 3a and 4a will be open, while in the cylinders of the control valves 51b and 51c associated with the air springs 3 and 4 the ports of the upper cylinder chambers 30 will be open. With this condition existing, compressed air will flow from the tank 34 to pipe 55 and thence through the pipe 72 and the lower cylinder chamber 31 in one cylinder in each of the control valves 50b and 50c and thence to the air spring 4a, as shown by the arrows g. There will also be a flow of compressed air from pipe 55 through pipes 73 and 74 and 75 through the upper cylinder chamber 30 of one cylinder of each of the control valves 51b and 51c and thus to the air release valve 62 of the front left air spring 3, as shown by the arrow h. There will also be a flow of compressed air from the pipe 73 through the connecting pipe 79 through the lower cylinder chamber 31 of one of the cylinders of each of the control valves 50c and 50b and thence to the front right air spring 3a, as shown by arrows k. There will also be a flow of compressed air from pipe 73 through pipe 76, including pipe 78, and the upper cylinder chamber 30 of one of the cylinders of control valve 51b and pipe 77 which communicates with the ports of the upper cylinder chamber 30 of one of the cylinders of the control valve 51c and thence to the air release valve 62 of the rear left air spring 4, as shown by the arrow j.

Each of the air springs 3a and 4a will thus have air added to them and each of the air springs 3 and 4 will have air released therefrom, with the result that the automobile body will be maintained in its normal level position. In this layout, the flow of compressed air from the source to any air spring or to any air-release valve is through the two control valves of a pair of tandem-connected control valves.

If it is the left hand side of the automobile body which is subjected to the forces which tend to depress it and the right hand side subjected to forces which tend to elevate it, then the ports in the lower cylinder chambers 31 of the control valves 51b and 51c will be open and the ports in the upper cylinder chambers 30 of said valves will be closed. Also the ports in upper cylinder chambers 30 of the control valves 50b and 50c will be open and those in the lower cylinder chambers 31 of said valves will be closed. When this condition exists added air will be delivered to the air springs 3 and 4, and air will be released from thte air springs 3a and 4a in the following manner. Air will flow through the pipes 73, 74, through the lower cylinder chamber 31 of one cylinder of each of the tandem-connected control valves 51c and 51b and through the pipe 80 to the air chamber of the front left air spring 3, and will also flow through the pipe 76, the lower cylinder chamber 31 of one cylinder of each of the tandem-connected control valves 51b and 51c and the pipe 81 to the air chamber of rear left air spring 4. There will also be a flow of compressed air through the pipes 72 and 85 and the upper cylinder chamber of one cylinder of control valve 50b, and through the pipes 73 and 86 and the upper cylinder chamber 30 of one of the cylinders of control valve 50c, which is tandem-connected to control valve 50b, and thus to the air release valve 62 of rear right air spring 4a as shown by arrow m. There will also be a flow of compressed air through pipes 73, and 79 through the upper cylinder chamber 30 of one cylinder of control valve 50c by way of the bypass pipe 83 and then through the pipe 84 and upper cylinder chamber 30 of the second cylinder of control valve 50b to the air release valve 62 of the front right air spring 3a. This results in adding air to the air springs 3 and 4 and releasing air from the air springs 3a and 4a, with the result that the automobile body will be maintained in its substantially level position.

If the automobile body is subjected to forces that tend to depress the front end and elevate the rear end, the ports in the lower cylinder chambers 31 of both cylinders of each front control valve 50b and 51b will be open and the ports in the upper cylinder chambers 30 of said valves will be closed, while the ports in the upper cylinder chambers 30 of each cylinder of the rear control valves 50c and 51c will be open and the ports in the lower cylinder chambers 31 of said control valves will be closed. When this condition exists air will flow through the pipes 72 and 73 and the lower cylinder chamber 31 of one cylinder of the control valve 50b and through the pipe 86 and the upper cylinder chamber 30 of one cylinder of control valve 51c to the release valve 62 of the left rear air spring 4, as shown by the arrows j, thereby releasing air therefrom.

There will also be a flow of air through the pipes 73 and 76 and through the lower chamber 31 of one cylinder of the control valve 51b and through the pipe 77 and the upper cylinder chamber 30 of one cylinder of control valve 51c to release valve 62 of the left rear air spring 4, as shown by the arrows j, thereby releasing air therefrom.

The depressing of the front end of the automobile will also result in delivering added air to both the front air springs 3 and 3a. The air is added to the left front air spring 3 through pipes 73, 74 and 80 and through the upper cylinder chamber 30 of one of the cylinders of control valve 51c and through the lower cylinder chamber 31 of one of the cylinders of control valve 51b, said control valves constituting a pair of tandem-connected valves. The air is added to the right front air springs 3a through the pipe 73, the pipe 79, the upper cylinder chamber 30 of one of the cylinders of control valve 50c by way of the pipe 83, and through the lower cylinder chamber 31 of one of the cylinders of the control valve 50b as shown by the arrows k. This addition of air to the two front air springs and releasing of air from the two rear air springs will maintain the automobile body in a substantially level position.

If the rear end of the automobile body is subjected to forces tending to depress it and the front end thereof is subjected to forces tending to elevate it, then the ports in the upper cylinder chambers 30 in the cylinders of both front control valves 50b and 51b will be open and the ports in the lower cylinder chambers 31 of the cylinders of the rear control valves 50c and 51c will be open. Compressed air will then be delivered to the rear right air spring 4a through the pipe 72 and the upper cylinder chamber 30 of one cylinder of the front control valve 50b by way of bypass pipe 85 and through the lower cylinder chamber 31 of one cylinder of the rear control valve 51b. Air will also be delivered to the left rear air spring 4 through pipes 73, 76 and 81 and through the upper cylinder chamber 30 of one cylinder of control valve 50c and the lower cylinder chamber 31 of one cylinder of control valve 51c. Air will also be released from the air springs 3 and 3a as follows: for the left front air spring 3, air will flow through the pipes 73, 74 and 75 and through the lower cylinder chamber 31 of one cylinder of the control valve 51c and the upper cylinder chamber 30 of one of the cylinders of control valve 51b, and thus to the release valve 62 of said left front air spring 3.

For the front right air spring 3a air will flow through pipes 73, 79 and 84, and through the lower cylinder chamber 31 of one of the cylinders of the control valve 50c and through the upper cylinder chamber 30 of one of the cylinders of the control valve 50b and thus to the air release valve 62 of said front right air spring 3a.

In Fig. 16 there is shown an arrangement in which the air pressure in all four air springs is controlled by a pair of tandem-connected control valves 50d and 51d, thereby to maintain the automobile body in its level position when said body is subjected to forces tending to tip it sideways. If such forces tend to depress the left side of the body and elevate the right side, air will flow from the tank 34 through the pipes 100, and 101 to the junction 102, the air passing through the lower cylinder chamber 31 of one cylinder of left control valve 51d and the upper cylinder chamber 30 of one of the cylinders of right control valve 50d. From the junction point 102 the air flows through pipe 103 to the air chamber of left front air spring 3, and also flows through the pipes 104 and 106 to the air chamber of left rear air spring 4. Air will also flow through the pipes 107 and 105 to the air release valves 62 of both the front right air spring 3a and the rear right air spring 4a. Air will thus be added to the air springs 3 and 4 supporting the left side of the automobile body which is subjected to forces tending to depress it, and released from the air springs 3a and 4a supporting the right side of the body which is subjected to forces tending to elevate it.

If the right side of the automobile body is subjected to forces tending to depress it and the left side is subjected to forces tending to elevate it, then the air is fed to the springs 3a and 4a and released from the springs 3 and 4 as follows: air from the pipe 100 will flow through pipe 117 to junction point 108, said air passing through the upper cylinder chamber 30 of one cylinder of control valve 51d and a lower cylinder chamber 31 of one of the cylinders of control valve 50d. From junction 108 air will flow through pipe 109 to the air release valve 62 of front left air spring 3 and through pipes 110 and 111 to the air release valve 62 of the left rear air spring 4. Compressed air will also flow from junction 108 through pipes 110 and 112 to the air chamber of the right rear air spring 4a and also through the pipe 113 to the air chamber of the right front air spring 3a and 114 to the air release valve 62 of left rear air spring 4 and through pipe 113 into right rear air spring 4a.

It will be noted that in order to introduce air into the air springs, or release air therefrom, it is necessary that the two control valves at either end of the automobile body or the two control valves at either side thereof should be operated simultaneously, because both the two valves at either the same end or the same side of said body must be opened in order to provide an open passage for the flow of air from the air source to either the air springs or the air release valves. It will further be noted that in every case, the flow of compressed air from the air source to any air spring to any air-release valve is always through a pair of tandem-connected control valves.

The apparatus above described is so constructed that if an automobile body is subjected to forces at both ends simultaneously tending to depress both ends below their normal position, the initial downward movement of both ends of the automobile body will result in delivering air to both the front air springs and the rear air springs simultaneously thus overcoming the tendency of the automobile body to be further depressed.

I claim:

1. Automatic stabilizing means for the air springs of an automobile in which the automobile body is supported on each side by a front and a rear air spring, said stabilizing means comprising a source of air under pressure, a normally closed air release valve for each air spring, each air release valve being constructed to open when air under pressure is delivered thereto thereby to release air from the corresponding air spring, a system of pipes connecting said air source to each air spring and also to each air release valve, a normally closed control valve mechanism located in said system of pipes, said control valve mechanism, when open, being operative to direct air from the air source either to the air chamber of the corresponding air spring or to the air release valve thereof, means rendered operative by the initial downward movement of one side of the automobile body and the rising movement of the other side thereof caused by forces tending to depress one of said sides below its normal position and to elevate the other side above its normal position, to open the control valve mechanism thereby to direct air from the air source into the air chambers of the air springs supporting the side of the automobile body which is subjected to the depressing force and to the air release valves of the air springs supporting the side of the automobile body which is subjected to the elevating force.

2. Automatic stabilizing means for an automobile in which the body thereof is supported by two front air springs and two rear air springs, which springs are carried by support members separate from the automobile body, said stabilizing means comprising a source of air under pressure, a normally closed control valve associated with each air spring, each control valve having a cylinder provided with upper and lower inlet ports and upper and lower discharge ports, a piston valve operating in the cylinder of each control valve and which is of a length to close all the ports of said valve when it is in its normal position, means connecting the cylinder of each control valve to the frame of the automobile body, means connecting the piston valve of each control valve to the support for the corresponding air spring whereby when either end of the automobile body is acted on by forces tending to depress said end below its normal position the cylinder of each control valve at said end of the body is moved downwardly and the lower inlet and discharge ports of each control valve will thus be opened, pipe connections between the air source and each inlet port of one control valve at said end of the automobile body, pipe connections between the discharge ports of said last named control valve and the inlet ports of the other control valve at said end of the automobile body, pipe connections between the lower discharge port of said other control valve and the air chambers of the air springs supporting the end of the automobile body subjected to downward pressure, whereby air from the air source will be delivered to said last named air springs.

3. Automatic stabilizing means for an automobile in which the body thereof is supported by two front air springs and two rear air springs, which springs are carried by support members separate from the automobile body, said stabilizing means comprising a source of air under pressure, a normally closed air release valve for each air spring, a normally closed control valve associated with each air spring, each control valve having a cylinder provided with upper and lower inlet ports and upper and lower discharge ports, a piston valve operating in the cylinder of each control valve and which is of a length to close all of the ports in the corresponding control valve when said piston valve is in its normal position, means connecting the cylinder of each control valve to the frame of the automobile body, means connecting the piston valve of each control valve to the support for the corresponding air spring, whereby when either end of the automobile body is acted on by forces tending to elevate it above its normal position the cylinder of each control valve at said end is moved upwardly and the upper inlet ports and discharge ports of said control valves will thus be opened, a pipe connection between the air source and each inlet port of one control valve at said end of the automobile body, pipe connections between the discharge ports of said one control valve and the inlet ports of the other control valve at said end of the automobile body and a pipe connecting the upper discharge port of said other control valve to the air release valve of the air springs supporting the end of the automobile body subjected to upward pressure whereby air will be released from said last named air springs.

4. Automatic stabilizing means for an automobile in which the body thereof is supported on each side in a front air spring and a rear air spring, which springs are mounted on support members that are separate from the automobile body, said stabilizing means comprising a source of air under pressure, a normally closed air release valve for each air spring, a normally closed control valve associated with each air spring, each control valve having a cylinder provided with upper and lower inlet ports and upper and lower discharge ports, a piston valve operating in the cylinder of each control valve and which is of a length to close all of the ports in the corresponding control valve when said piston valve is in its normal position, means connecting the cylinder of each control valve to the frame of the automobile body, means connecting the piston valve of each control valve to the support for the corresponding air spring, whereby when either side of the automobile body is acted on by forces tending to elevate it above its normal position the cylinder of each control valve at said side is moved upwardly and the upper inlet ports and discharge ports of said control valves will thus be opened, a pipe connection between the air source and each inlet port of one control valve at said side of the automobile body, pipe connections between the discharge ports of said one control valve and the inlet ports of the other control valve at said side of the automobile body and a pipe connecting the upper discharge port of said other control valve to the air release valve of the air springs supporting the side of the automobile body subjected to upward pressure whereby air will be released from said last named air springs.

5. Automatic stabilizing means for the air springs of an automobile in which the automobile body is supported at the front end by two front air springs and at the rear by two rear air springs, said stabilizing means comprising a source of air under pressure, a normally closed air-release valve for each air spring, each air-release valve being constructed to open when air under pressure is delivered thereto, thereby to release air from the corresponding air spring, a system of pipes connecting said air source to each air spring and also to each air-release valve, a normally closed control valve for each air spring located in said system of pipes, said control valves being arranged in pairs with the control valves of each pair connected tandem by said pipes, means rendered operative by the simultaneous upward movement of both of the two portions of the automobile body that are supported by the two air springs that correspond to the two control valves of any pair to set both of said control valves to deliver compressed air from the source of air pressure through the two control valves of said pair successively to the air-release valves of the corresponding air springs, thereby to release air therefrom.

6. Automatic stabilizing means for the air springs of an automobile in which the automobile body is supported at the front end by two front air springs and at the rear end by two rear springs, said stabilizing means comprising a source of air under pressure, a normally closed air-release valve for each spring, each air-release valve being constructed to open when air under pressure is delivered thereto, thereby to release air from the corresponding air spring, a system of pipes connecting said air source to each air-release valve, a normally closed control valve for each air spring located in said system of pipes, the two control valves for the air springs at each end of the automobile being connected tandem by said pipes, means rendered operative by the upward movement of either end of the automobile body to set the air control valves corresponding to the air springs at said end to deliver compressed air from the air source through the said two control valves successively and thus to the air-release valves of the corresponding air springs, thereby to release air therefrom.

7. Automatic stabilizing means for the air springs of an automobile in which the automobile body is supported at the front end by two front air springs and at the rear end by two rear springs, said stabilizing means comprising a source of air under pressure, a normally closed air-release valve for each spring, each air-release valve being constructed to open when air under pressure is delivered thereto, thereby to release air from the corresponding air spring, a system of pipes connecting said air source to each air-release valve, a normally closed control valve for each air spring located in said system of pipes, the control valves on each side of the automobile being connected tandem by said pipes, means rendered operative by the upward movement of either side of the automobile above its normal level to set the control valves for the air springs on the upwardly moving side of the automobile to deliver compressed air from the source of compressed air through said two control valves successively and then to the air-release valves on said upwardly moving side of the automobile, thereby to release air from the air springs on said side.

8. Automatic stabilizing means for the air springs of an automobile in which the automobile body is supported at the front end by two front air springs and at the rear end by two rear springs, said stabilizing means comprising a source of air under pressure, a normally closed air-release valve for each air spring, each air-release valve being constructed to open when air under pressure is delivered thereto, thereby to release air from the corresponding air spring, a system of pipes connecting said source of air pressure to each air spring and also to each air-release valve, a pair of normally closed control valve devices separate from the air springs and located in said system of pipes, said control valve devices being tandem connected by said pipes, means rendered operative by the initial downward movement of either side or either end of the automobile body below its normal level due to forces tending to depress said side or end, and also rendered operative by the upward movement of either side or end of the automobile body above its normal level due to forces tending to elevate said side or end, to open both of the control valve devices to admit compressed air through the two control valve devices successively and to the air springs at the side or end of the automobile body that is subjected to a depressing force and to the air-release valves on the side or end of the automobile body which is subjected to an elevating force.

References Cited in the file of this patent
UNITED STATES PATENTS

| | | |
|---|---|---|
| 1,721,732 | Hawkins | July 23, 1929 |
| 1,990,517 | Bedford | Feb. 12, 1935 |
| 2,361,575 | Thompson | Oct. 31, 1944 |
| 2,443,433 | Sanmori | June 15, 1948 |